United States Patent
Takashima et al.

(10) Patent No.: US 7,319,582 B2
(45) Date of Patent: Jan. 15, 2008

(54) MULTILAYER CAPACITOR AND METHOD OF MANUFACTURING THE SAME

(75) Inventors: Hirokazu Takashima, Echizen (JP); Yoshikazu Takagi, Echizen (JP); Hiroshi Ueoka, Echizen (JP); Teruo Yoshida, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 8 days.

(21) Appl. No.: 10/567,011

(22) PCT Filed: Apr. 8, 2005

(86) PCT No.: PCT/JP2005/006939

§ 371 (c)(1),
(2), (4) Date: Feb. 1, 2006

(87) PCT Pub. No.: WO2005/119713

PCT Pub. Date: Dec. 15, 2005

(65) Prior Publication Data

US 2006/0250747 A1    Nov. 9, 2006

(30) Foreign Application Priority Data

Jun. 3, 2004 (JP) .............................. 2004-165350

(51) Int. Cl.
*H01G 4/005* (2006.01)
*H01G 4/06* (2006.01)
(52) U.S. Cl. ...................... 361/303; 361/311; 29/25.42
(58) Field of Classification Search ........ 361/303–305, 361/311, 309; 29/25.42
See application file for complete search history.

(56) References Cited

U.S. PATENT DOCUMENTS

| 4,942,610 | A | * | 7/1990 | Rayburn ..................... 361/309 |
| 6,331,930 | B1 | | 12/2001 | Kuroda et al. |
| 6,829,134 | B2 | * | 12/2004 | Yamauchi et al. .......... 361/303 |
| 2003/0011963 | A1 | | 1/2003 | Ahiko et al. |

FOREIGN PATENT DOCUMENTS

| GB | 2034521 A | * | 6/1980 |
| JP | 61-183913 | | 8/1986 |
| JP | 63-036677 | | 9/1988 |
| JP | 09232179 A | * | 9/1997 |
| JP | 11-144996 | | 5/1999 |
| JP | 11-312623 | | 11/1999 |
| JP | 2001-028318 | | 1/2001 |
| JP | 2001-155959 | | 6/2001 |
| JP | 2003-031435 | | 1/2003 |
| JP | 2003-045740 | | 2/2003 |

OTHER PUBLICATIONS

International Search Report for PCT Application No. PCT/JP2005/006939, mailed Jul. 19, 2005.

* cited by examiner

*Primary Examiner*—Eric Thomas
(74) *Attorney, Agent, or Firm*—Keating & Bennett, LLP (57) ABSTRACT

A multilayer capacitor includes first and second internal electrodes that are opposed to each other so as to generate an electrostatic capacitance and have a capacitance generating portion functioning to generate the electrostatic capacitance, terminal connecting portions connected to corresponding external terminal electrodes, and extended portions connecting the capacitance generating portion to the terminal connecting portions. The extended portions are narrower than the capacitance generating portion and the terminal connecting portion and are curved in the direction of their thickness so as to provide a longer effective length. The multi-terminal capacitor is capable of increasing an ESR without adding a separate additional element.

11 Claims, 6 Drawing Sheets

MULTILAYER CAPACITOR AND METHOD OF MANUFACTURING THE SAME

BACKGROUND OF THE INVENTION

1. Field of the Invention

The present invention relates to a multilayer capacitor and a method of manufacturing the multilayer capacitor. More particularly, the present invention relates to an improvement in the structure of an internal electrode in the multilayer capacitor.

2. Description of the Related Art

An equivalent circuit of a capacitor is represented by a circuit having C, L, and R connected in series, where the capacitance of the capacitor is denoted by C, an equivalent series inductance (ESL) is denoted by L, and an equivalent series resistance (ESR) is denoted by R.

The resonant frequency ($f_0$) of this equivalent circuit is equal to $1/[2\pi \times (L \times C)^{1/2}]$ and the equivalent circuit does not function as a capacitor in a frequency band higher than this resonant frequency. In other words, decreasing the value of L, or ESL, increases the resonant frequency and, therefore, the equivalent circuit functions as a capacitor in a higher frequency band.

For example, a decoupling capacitor, which is used in a frequency range of MHz and GHz in a power supply circuit that supplies power to the chip of a micro processing unit (MPU) of, for example, a workstation or a personal computer, requires a capacitor having a lower ESL. For example, a multi-terminal capacitor 1 shown in FIG. 12 is known as a capacitor having a lower ESL (for example, refer to Japanese Unexamined Patent Application Publication No. 11-144996).

Figure 12:
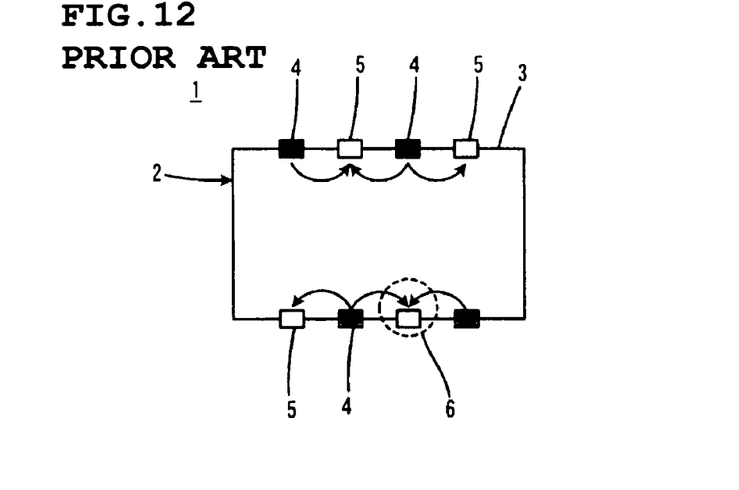
FIG. 12 is a plan view schematically showing a conventional multi-terminal capacitor to which the present invention is applicable.

FIG. 12 is a plan view schematically showing the multi-terminal capacitor 1.

The multi-terminal capacitor 1 has a rectangular prismatic main body 2. First external terminal electrodes 4 and second external terminal electrodes 5, having different polarities, are alternately arranged on a side surface 3 of the main body 2. In order to clearly distinguish between the first external terminal electrodes 4 and the second external terminal electrodes 5 in FIG. 12, the first external terminal electrodes 4 are shown by solid rectangles and the second external terminal electrodes 5 are shown by rectangles in outline only.

At least one pair of first and second internal electrodes (not shown) that are opposed to each other so as to generate an electrostatic capacitance is provided in the main body 2. The first external terminal electrodes 4 described above are electrically connected to the first internal electrode and the second external terminal electrodes 5 described above are electrically connected to the second internal electrode.

When current flows from the first external terminal electrodes 4 to the second external terminal electrodes 5, for example, as shown by arrows in FIG. 12, magnetic fluxes are generated whose directions are determined in accordance with the direction of the current to produce self inductance components. Since the magnetic fluxes in different directions exist in a portion in which currents having different directions flow, for example, in a portion surrounded by a broken circle 6, the magnetic fluxes are offset, resulting in a reduction in the magnetic fluxes. Accordingly, it is possible to decrease the ESL.

The decoupling capacitor in a power supply circuit that supplies power to the chip of the MPU of, for example, a personal computer is used for noise absorption and for smoothing a variation in the power supply.

Figure 13:
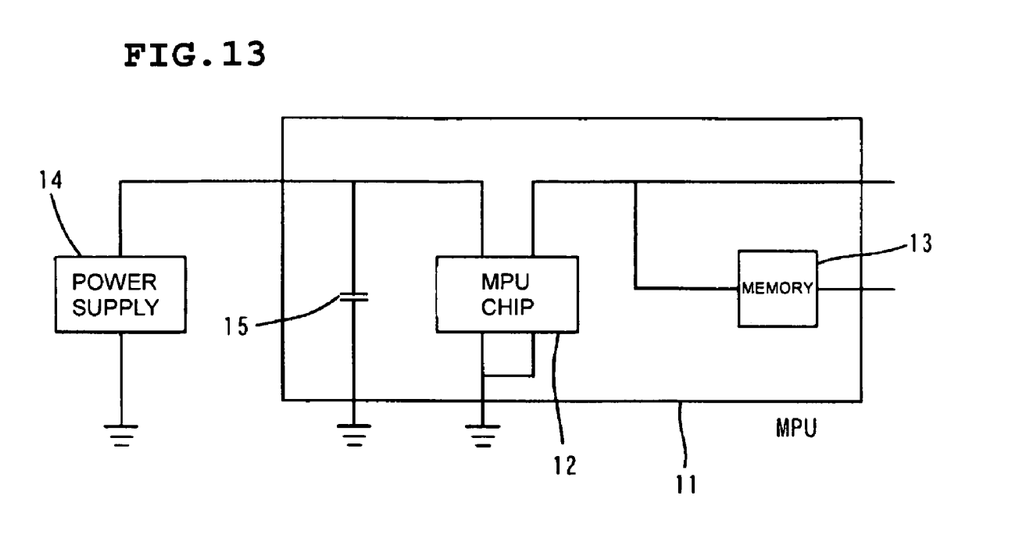
FIG. 13 is a block diagram schematically showing an example of the structure in which an MPU including a decoupling capacitor, which is a typical application of the multi-terminal capacitor shown in FIG. 12, is connected to a power supply unit.

FIG. 13 is a block diagram schematically showing an example of the structure in which an MPU is connected to a power supply unit.

An MPU 11 includes an MPU chip 12 and a memory 13. A power supply unit 14 supplies power to the MPU chip 12, and a decoupling capacitor 15 is connected to the circuit between the power supply unit 14 and the MPU chip 12.

When, for example, a multilayer ceramic capacitor is used, such as the decoupling capacitor described above, there is a problem in that it is difficult for the multilayer ceramic capacitor to stably operate in a higher frequency band because the multilayer ceramic capacitor is characterized by having a capacitance variation of several percent and specific temperature characteristics. Hence, multiple multilayer ceramic capacitors having different capacitances are connected to each other in parallel to produce a required impedance in a wider frequency band.

However, the multilayer ceramic capacitor has sharp impedance characteristics because it has a high Q and, therefore, the peak tends to rise in a portion where the impedance characteristics of the multiple multilayer ceramic capacitors are combined. This rise will be specifically described with reference to FIGS. 14A and 14B.

Figure 14A:
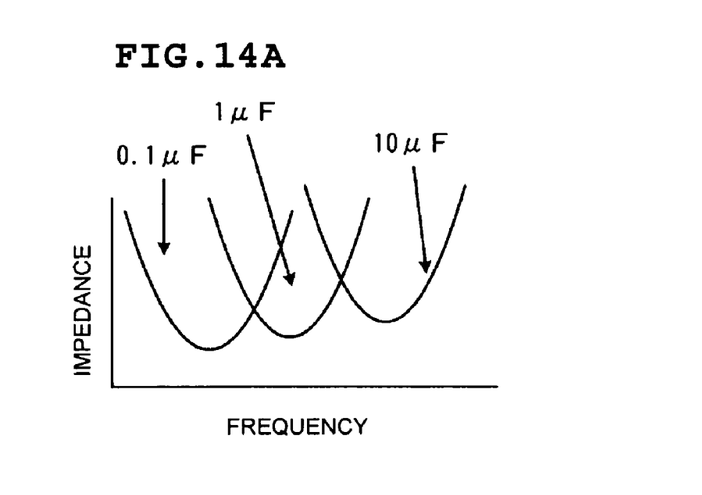
FIGS. 14A and 14B include graphs showing impedance characteristics in a case where multiple ceramic capacitors having different capacitances are connected to each other in parallel.
Figure 14B:
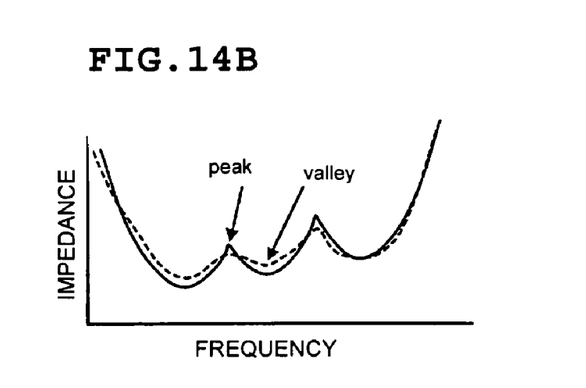

FIGS. 14A and 14B include graphs showing impedance characteristics in a case where multiple ceramic capacitors having different capacitances are connected to each other in parallel. FIG. 14A shows the respective impedance characteristics of a multilayer ceramic capacitor having a capacitance of 0.1 µF, a multilayer ceramic capacitor having a capacitance of 1 µF, and a multilayer ceramic capacitor having a capacitance of 10 µF. FIG. 14B shows combined impedance characteristics when these three multilayer ceramic capacitors are connected to each other in parallel.

As shown in FIG. 14A, the multilayer ceramic capacitors have sharp impedance characteristics. Accordingly, the peaks rise in portions where the impedance characteristics are combined to increase the impedance. As a result, there is a problem in that it is not possible to sufficiently reduce the noise in such a frequency band.

In order to resolve the problem to decrease the difference between the peaks and valleys in portions where the impedance characteristics are combined and to produce flat impedance characteristics, as shown by a broken line in FIG. 14B, it is necessary to connect a resistor to the capacitors in series. In other words, connecting the resistor to the capacitors in series allows the Q to be reduced to lower the peaks in the portions where the impedance characteristics are combined, as shown by the broken line in FIG. 14B.

However, if the resistance of the resistor connected in series is too high, the valleys rise, that is, the impedance increases while flat impedance characteristics can be produced and, therefore, it is not possible to produce the required noise absorption characteristics.

In order to inhibit the whole impedance characteristics from becoming too high while maintaining the flatness, a resistor having a minor resistance of, for example, one hundred and several tens mΩ to several hundred mΩ is required.

However, since it is difficult to mount a resistor having such a minor resistance as a part separate from the capacitor and the number of parts is increased, an increased resistance of the capacitor itself, that is, an increased ESR is considered.

It is sufficient to increase the resistance of the internal electrodes in order to increase the ESR of the multilayer ceramic capacitor, so that methods of (1) using a metal having a higher resistivity as the internal electrodes, (2)

decreasing the number of layers of the internal electrodes, (3) reducing the coverage of the internal electrodes, and so on are considered. However, since the characteristics of the capacitances, etc. are greatly varied when using such methods, there is a limit to producing a resistance of one hundred and several tens mΩ to several hundred mΩ using only these methods.

Narrowing extended portions of the internal electrodes in the multilayer ceramic capacitor having a general structure to increase the ESR is known (for example, refer to Japanese Utility Model Publication No. 63-36677).

As described in Japanese Utility Model Publication No. 63-36677, decreasing the width of the extended portions of the internal electrodes to increase the ESR does not require a resistor to be provided as a part separate from the capacitor and does not have a great impact on the characteristics, such as the capacitance value, so that the decreased width of the extended portions of the internal electrodes can be considered a desirable structure for increasing the ESR.

However, when such a structure for increasing the ESR is applied to the multi-terminal capacitor described in, for example, Japanese Unexamined Patent Application Publication No. 11-144996, further decreasing the small width of the extended portions of the internal electrodes in the multi-terminal capacitor can cause the electrodes to be severed during firing. Accordingly, particularly in the multi-terminal capacitor, there is a limit to providing a smaller width in the extended portions of the internal electrode and to further decreasing the width of these parts. Consequently, it is difficult to produce a resistance of, for example, one hundred and several tens mΩ to several hundred mΩ.

SUMMARY OF THE INVENTION

In order to overcome the problems described above, preferred embodiments of the present invention provide a multilayer capacitor for increasing the ESR and a method of manufacturing the multilayer capacitor.

One preferred embodiment of the present invention is directed to a multilayer capacitor including a main body that is a rectangular prism having two main surfaces opposed to each other and four side surfaces connecting the main surfaces to each other, the main body has a layered structure and includes a plurality of dielectric layers that extend in the direction in which the main surfaces extend and are layered on top of one another. The multilayer capacitor further includes at least one pair of first and second internal electrodes that are arranged along particular boundary surfaces between the dielectric layers and are opposed to each other so as to generate an electrostatic capacitance, and first and second external terminal electrodes provided on an external surface of the main body so as to be electrically connected to the first and second internal electrodes, respectively.

In this multilayer capacitor, each of the first and second internal electrodes has a capacitance generating portion functioning to generate the electrostatic capacitance, a terminal connecting portion connected to the external terminal electrode, and an extended portion connecting the capacitance generating portion to the terminal connecting portion. In order to resolve the technical problems described above, the extended portion of at least one of the internal electrodes is curved in the direction of its thickness, that is, in a direction that is substantially perpendicular to a plane including the internal electrode.

The multilayer capacitor according to the present preferred embodiment preferably further includes a dummy electrode arranged so as to be layered on the terminal connecting portion of the internal electrode with a dielectric layer disposed therebetween, by a manufacturing method described below.

The extended portion curved in the direction of its thickness is preferably narrower than the capacitance generating portion and the terminal connecting portion.

The extended portion curved in the direction of its thickness is preferably thinner than the capacitance generating portion and the terminal connecting portion.

At least one pair of the internal electrodes in the multilayer capacitor according to another preferred embodiment is preferably provided near the main surface of the main body, opposing a mounting surface.

The above-described preferred embodiments are advantageously applicable to a multi-terminal capacitor, that is, to a multilayer capacitor in which the first and second external terminal electrodes are alternately arranged along a particular side surface of the main body.

Another preferred embodiment of the present invention is directed to a method of manufacturing the multilayer capacitor described above. The multilayer capacitor includes a main body that is a rectangular prism having two main surfaces opposed to each other and four side surfaces connecting the main surfaces to each other, the main body has a layered structure and includes a plurality of dielectric layers that extend in the direction in which the main surfaces extend and are layered on top of one another. The multilayer capacitor further includes at least one pair of first and second internal electrodes that are arranged along particular boundary surfaces between the dielectric layers and that are opposed to each other so as to generate an electrostatic capacitance, and first and second external terminal electrodes provided on an external surface of the main body so as to be electrically connected to the first and second internal electrodes, respectively. Each of the first and second internal electrodes has a capacitance generating portion functioning to generate the electrostatic capacitance, a terminal connecting portion connected to the external terminal electrode, and an extended portion connecting the capacitance generating portion to the terminal connecting portion. The extended portion of at least one of the internal electrodes is curved in the direction of its thickness.

The method of manufacturing the multilayer capacitor, according to the present preferred embodiment, includes steps of preparing a plurality of ceramic green sheets, which serve as the dielectric layers, forming the internal electrode on the ceramic green sheet, forming a dummy electrode on the ceramic green sheet so as to be overlapped with the terminal connecting portion of the internal electrode, layering and pressing the plurality of ceramic green sheets in order to provide the main body in an unfired state, and firing the main body.

The step of layering and pressing the ceramic green sheets includes a step of pressing a portion of the ceramic green sheets provided between the capacitance generating portions of the internal electrodes and between the terminal connecting portion and the dummy electrode so as to flex toward the extended portion of the internal electrode to curve the extended portion in the direction of its thickness.

In the method of manufacturing the multilayer capacitor according to the present preferred embodiment, the step of forming the dummy electrode preferably includes a step of forming the dummy electrode on a ceramic green sheet having no internal electrode provided thereon. In this case, the step of layering and pressing the ceramic green sheets preferably includes a step of layering and preliminarily pressing the ceramic green sheet having the dummy electrode provided thereon, but having no internal electrode provided thereon, to flex a portion of the ceramic green sheet and to curve the inner edge of the dummy electrode in the layering direction, and a step of layering and preliminarily pressing the ceramic green sheet having the internal electrode provided thereon to curve the extended portion in the direction of its thickness along the curvature of the inner edge of the dummy electrode.

In the present preferred embodiment described above, the step of forming the dummy electrode preferably further includes a step of forming the dummy electrode on the ceramic green sheet having the internal electrode provided thereon.

According to the above preferred embodiment of the multilayer capacitor, since the extended portion of at least one of the internal electrodes is curved in the direction of its thickness, the effective length of the extended portion can be increased. Accordingly, it is possible to increase the ESR with a minor resistance of, for example, one hundred and several tens mΩ to several hundred mΩ without greatly decreasing the width of the extended portion and, therefore, resolving problems such as the electrode that is severed during firing.

Consequently, the multilayer capacitor according to the preferred embodiments described above contributes to providing flat impedance characteristics and can be advantageously used as a decoupling capacitor for noise absorption and for smoothing a variation in the power supply in, for example, an MPU.

Further providing the dummy electrode so as to be layered on the terminal connecting portion of the internal electrode with a dielectric layer disposed therebetween can improve the reliability of the connection between the internal electrode and the external terminal electrode.

Making the extended portion curved in the direction of its thickness narrower than the capacitance generating portion and the terminal connecting portion or making the extended portion curved in the direction of its thickness thinner than the capacitance generating portion and the terminal connecting portion can easily increase the ESR.

Providing at least one pair of the internal electrodes near the main surface of the main body, opposing the mounting surface, decreases a minimum current loop provided between the first and second external terminal electrodes so as to contribute to decreasing the ESL. In addition, this reduces a stray capacitance generated between the multilayer capacitor and the mounting surface and prevents secondary resonance from being caused in a higher frequency band.

In the case of the multi-terminal capacitor in which the first and second external terminal electrodes are alternately arranged along a particular side surface of the main body, since the widths of the extended portions and the terminal connecting portions are originally small, there is a limit to further decreasing the widths. Accordingly, curving the extended portion in the direction of its thickness to increase the ESR, as in the preferred embodiments above, can be considered as a desirable structure for effectively avoiding the electrode that is severed during firing, and so on.

According to the method of manufacturing the multilayer capacitor, since the dummy electrode is formed to flex a portion of the ceramic green sheet during the pressing of the layered ceramic green sheet and to curve the extended portion in the direction of its thickness, no special process for curving the extended portion is required, thus efficiently manufacturing the multilayer capacitor described above.

In the method of manufacturing the multilayer capacitor according to various preferred embodiments described above, forming the dummy electrode on the ceramic green sheet having no internal electrode provided thereon and layering and preliminarily pressing the ceramic green sheet having the dummy electrode provided thereon, but having no internal electrode provided thereon, to curve the inner edge of the dummy electrode in the layering direction and, then, layering and preliminarily pressing the ceramic green sheet having the internal electrode provided thereon to curve the extended portion in the direction of its thickness along the curvature of the inner edge of the dummy electrode can surely provide the curvature of the extended portion.

In the above-described case, forming the dummy electrode on the ceramic green sheet having the internal electrode provided thereon causes more flexing of the ceramic green sheets in the pressing. As a result, it is possible to curve the extended portion to a greater extent.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 14A shows the respective impedance characteristics of the multiple ceramic capacitors, and FIG. 14B shows combined impedance characteristics when these ceramic capacitors are connected to each other in parallel.

DETAILED DESCRIPTION OF PREFERRED EMBODIMENTS

Preferred embodiments of a multi-terminal capacitor will now be described.

Figure 1:
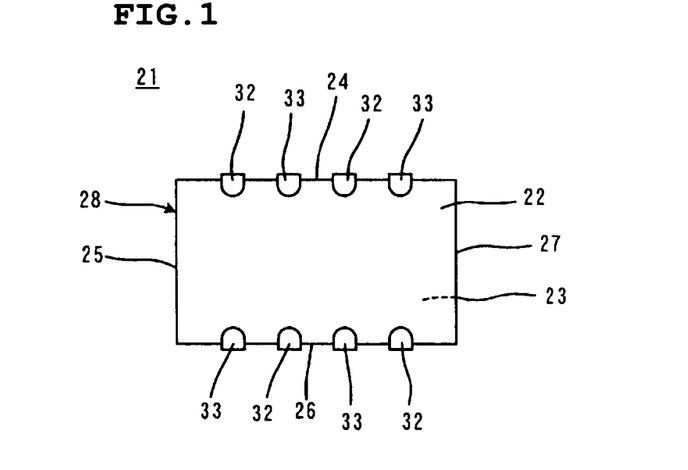
FIG. 1 is an external view of a multi-terminal capacitor according to a first preferred embodiment of the present invention.

A first preferred embodiment of the present invention will be described with reference to FIGS. 1 to 5. FIG. 1 is an external view of a multi-terminal capacitor 21. FIGS. 2A to 2D include plan views showing the internal structure of the multi-terminal capacitor 21, and showing different cross sections of the multi-terminal capacitor 21.

The multi-terminal capacitor 21 preferably has a substantially rectangular prismatic main body 28 including two main surfaces 22 and 23 opposed to each other and four side surfaces 24, 25, 26, and 27 connecting the main surface 22 to the main surface 23, as shown in the external view in FIG. 1.

The main body 28 has a layered structure and includes a plurality of dielectric layers 29 that extend in the direction in which the main surfaces 22 and 23 extend and are layered on top of one another, and at least one pair of first and second internal electrodes 30 and 31 that are provided along particular boundary surfaces between the dielectric layers 29 and that are opposed to each other so as to generate an electrostatic capacitance. Each of the dielectric layers 29 is preferably made of, for example, a ceramic dielectric body.

Figure 2A:
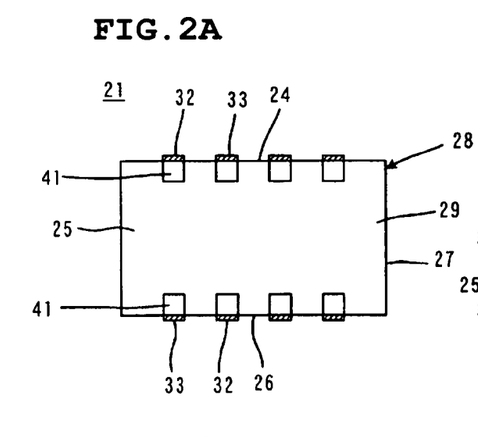
FIGS. 2A to 2D include plan views showing different cross sections of the internal structure of the multi-terminal capacitor shown in FIG. 1.
Figure 2B:
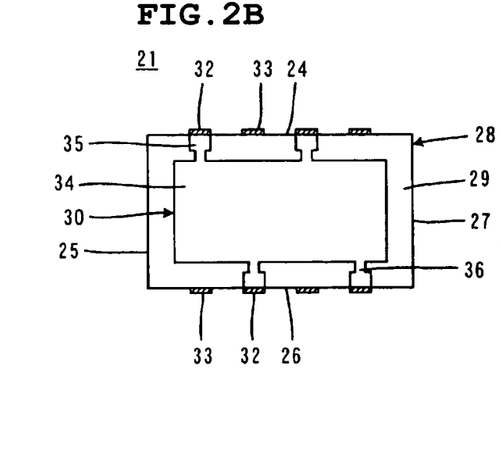
Figure 2C:
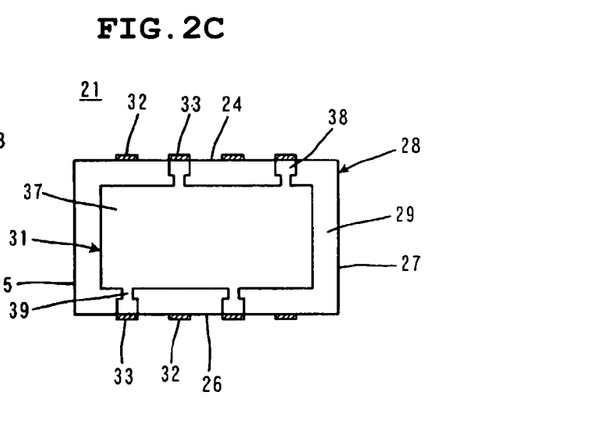

A cross section through which the first internal electrode 30 extends is shown in FIG. 2B and a cross section through which the second internal electrode 31 extends is shown in FIG. 2C.

Specifically, as shown in FIGS. 1 and 2A to 2D, first and second external terminal electrodes 32 and 33 are arranged on the external surfaces of the main body 28 so as to extend from the main surface 22 to the main surface 23 along the side surface 24 or 26 opposed to each other. More particularly, two pairs of the first and second external terminal electrodes 32 and 33 are alternately arranged along the side surface 24 and two pairs of the first and second external terminal electrodes 32 and 33 are alternately arranged along the side surface 26.

The first and second external terminal electrodes 32 and 33 are electrically connected to the first and second internal electrodes 30 and 31, respectively. This electrical connection will now be described in detail.

Figure 3:
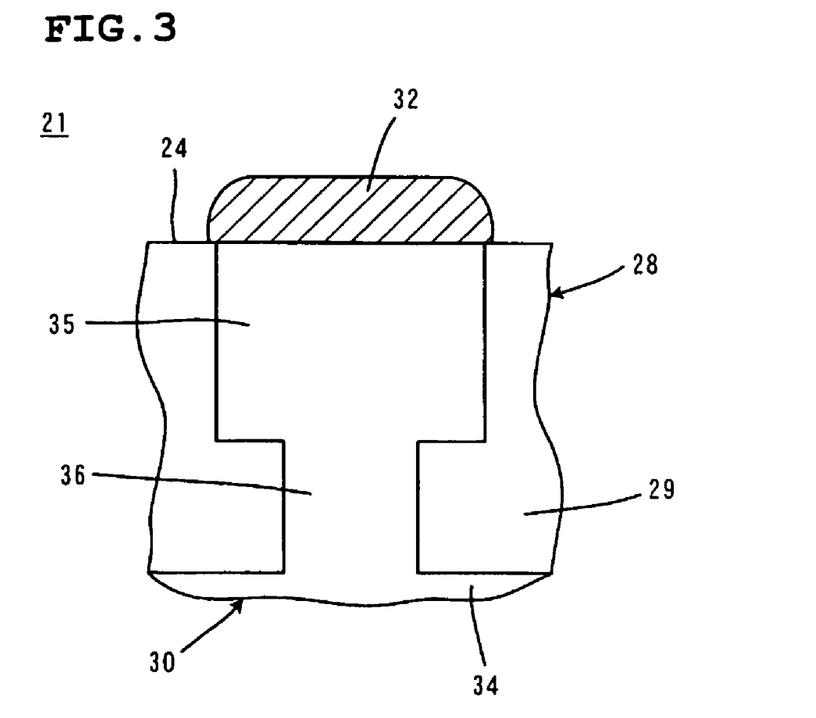
FIG. 3 is an enlarged plan view of a portion of a first internal electrode shown in FIG. 2B.

The first internal electrode 30 has a capacitance generating portion 34 functioning to generate the electrostatic capacitance, terminal connecting portions 35 connected to the first external terminal electrodes 32, and extended portions 36 connecting the capacitance generating portion 34 to the terminal connecting portions 35, as shown in FIG. 2B. FIG. 3 is an enlarged view of a portion of the first internal electrode 30, that is, of one of the terminal connecting portions 35 and the corresponding extended portion 36.

The second internal electrode 31 has a capacitance generating portion 37 that is opposed to the capacitance generating portion 34 of the first internal electrode 30 and functions to generate the electrostatic capacitance, terminal connecting portions 38 connected to the second external terminal electrodes 33, and extended portions 39 connecting the capacitance generating portion 37 to the terminal connecting portions 38, as shown in FIG. 2C.

Figure 4:
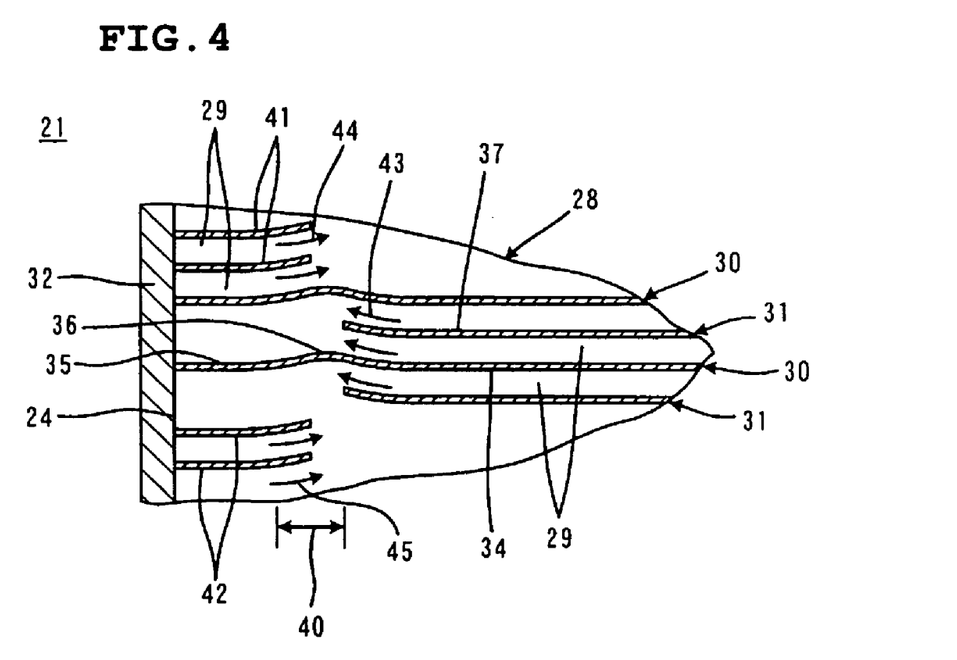
FIG. 4 is an enlarged cross-sectional front view showing a portion of the internal structure of the multi-terminal capacitor shown in FIG. 1.

The extended portions 36 described above are narrower than the capacitance generating portion 34 and the terminal connecting portions 35, and the extended portions 39 described above are narrower than the capacitance generating portion 37 and the terminal connecting portions 38. In addition, the extended portions 36 and 39 are curved in the direction of their thickness. One of the curved extended portions 36 of the first internal electrode 30 is shown in FIG. 4. FIG. 4 is an enlarged cross-sectional front view showing a portion of the internal structure of the multi-terminal capacitor 21. Referring to FIG. 4, the extended portion 36 of the first internal electrode 30 is within a range 40 shown by a double sided arrow.

The multi-terminal capacitor 21 has dummy electrodes 41 and 42. The dummy electrodes 41 are arranged so as to be layered on the terminal connecting portions 35 of the first internal electrode 30, and the dummy electrodes 42 are arranged so as to be layered on the terminal connecting portions 38 of the second internal electrode 31, with a respective dielectric layer disposed therebetween. According to this preferred embodiment, the dummy electrodes 41 are arranged so as to extend toward positions opposed to the lengthwise intermediate portions of the extended portions 36 of the first internal electrode 30, and the dummy electrodes 42 are arranged so as to extend toward positions opposed to the lengthwise intermediate portions of the extended portions 39 of the second internal electrode 31.

The dummy electrodes 41 are provided above the internal electrodes 30 and 31 and are arranged along boundary surfaces between the dielectric layers 29 having no internal electrodes arranged thereon, as shown in FIGS. 2A and 4. In contrast, the dummy electrodes 42 are provided below the internal electrodes 30 and 31 and are arranged along boundary surfaces between the dielectric layers 29 having no internal electrodes arranged thereon, as shown in FIGS. 2D and 4.

A method of manufacturing the multi-terminal capacitor 21 described above will now be described.

First, a plurality of ceramic green sheets, which serve as the dielectric layers 29, is prepared.

Figure 2D:
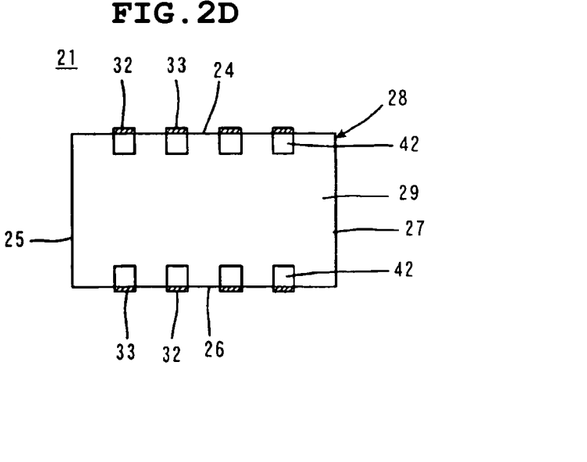

Next, the dummy electrodes 41 shown in FIG. 2A are arranged on a particular ceramic green sheet, the first internal electrode 30 shown in FIG. 2B is arranged on another ceramic green sheet, the second internal electrode 31 shown in FIG. 2C is arranged on another ceramic green sheet, and the dummy electrodes 42 shown in FIG. 2D are arranged on another ceramic green sheet. The dummy electrodes 41 and 42 and the internal electrodes 30 and 31 are formed by printing conductive pastes on the ceramic green sheets.

Next, the plurality of ceramic green sheets are layered in a certain order and pressed in the layering direction in order to produce the main body 28 in an unfired state. Cutting is subsequently performed, if required.

FIG. 4 shows a state after firing in which the ceramic green sheets are sintered to form the dielectric layers 29. Flexing of the ceramic green sheets corresponding to the dielectric layers 29 is shown by arrows 43 to 45 in FIG. 4.

In the process of pressing the ceramic green sheets layered in the manner described above, a portion of the ceramic green sheets flex from portions where the internal electrodes 30 and 31 and the dummy electrodes 41 and 42 are overlapped on the ceramic green sheets to portions where the internal electrodes 30 and 31 and the dummy electrodes 41 and 42 are not overlapped thereon due to the thicknesses of the internal electrodes 30 and 31 and the dummy electrodes 41 and 42 constraining the ceramic green sheets, as described below.

Specifically, a portion of the ceramic green sheets provided between the capacitance generating portion 34 of the internal electrode 30 and the capacitance generating portion 37 of the internal electrode 31 flex toward the extended portions 36 of the internal electrode 30 and the extended portions 39 of the internal electrode 31, as shown by arrows 43. A portion of the ceramic green sheets provided between the terminal connecting portions 35 and 38 of the internal electrodes 30 and 31 and the dummy electrodes 41 and 42 flex toward the extended portions 36 of the internal electrode 30 and the extended portions 39 of the internal electrode 31, as shown by arrows 44 and 45. This flexing acts to curve the extended portions 36 and 39 in the direction of their thickness, as described above.

In order to reliably curve the extended portions 36 and 39, it is preferable to use the following method.

Figure 5:
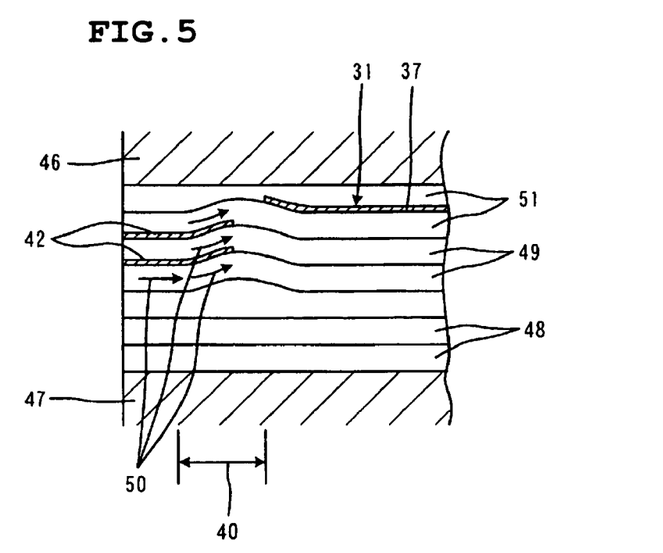
FIG. 5 is a cross-sectional view showing a state during a process of layering and pressing ceramic green sheets in order to manufacture the multi-terminal capacitor shown in FIG. 1.

FIG. 5 shows a state during the process of layering and pressing the ceramic green sheets. A portion of an upper press die 46 and a portion of a lower press die 47 are shown in FIG. 5.

As shown in FIG. 5, some ceramic green sheets 48 having no internal electrodes and no dummy electrodes arranged thereon are layered and, then, some ceramic green sheets 49 having the dummy electrodes 42 arranged thereon are layered. Bringing the upper press die 46 close to the lower press die 47 at this stage causes the ceramic green sheets 48 and 49 to be preliminarily pressed against each other.

Although steps are formed due to the thicknesses of the dummy electrodes 42, a portion of the ceramic green sheets 48 and 49 flex in a direction that makes the steps more gradual, as shown by arrows 50, in the above-described pressing process. As a result, the inner edges of the dummy electrodes 42 are curved in the layering direction. The arrows 50 correspond to the arrows 45 in FIG. 4.

Next, a ceramic green sheet 51 having the second internal electrode 31 arranged thereon and a ceramic green sheet 51 having the first internal electrode 30 arranged thereon are alternately layered, and are preliminarily pressed with the upper press die 46 and the lower press die 47. This pressing curves the extended portions 36 of the internal electrodes 30 and the extended portions 39 of the internal electrodes 31 in the direction of their thickness along the curvature of the inner edges of the dummy electrodes 42 described above. The curvature of the extended portions 36 of the first internal electrode 30, shown in FIG. 4, is created by the above-described process.

Since the thicknesses of the capacitance generating portion 34 of the internal electrode 30 and the capacitance generating portion 37 of the internal electrode 31 are superimposed on the thicknesses of the dummy electrodes 41 and 42 after the process of further layering and pressing the ceramic green sheets 50 having the internal electrode 30 or 31 arranged thereon and the process of layering and pressing the ceramic green sheets having the dummy electrodes 41 arranged thereon are performed, the curvature of the extended portions 36 and 39 described above is increased.

When the extended portions 36 and 39 are curved in the manner described above, the extended portions 36 and 39 are thinner than the capacitance generating portions 34 and 37 and the terminal connecting portions 35 and 38. This contributes to an increase in the ESR.

Next, the unfired main body 28 manufactured in the manner described above is fired to provide the main body 28 for the multi-terminal capacitor 21. The first and second external terminal electrodes 32 and 33 are formed on the external surface of the main body 28 by baking, for example, the conductive paste, and the multi-terminal capacitor 21 is thus produced.

Experimental examples performed according to the preferred embodiments described above will now be described in order to confirm the effects of the present invention.

In these experimental examples, multi-terminal capacitors each having the appearance shown in FIG. 1 are manufactured according to Samples 1 to 6 shown in Table 1. Each of the multi-terminal capacitors has eight external terminal electrodes and is designed so as to have an electrostatic capacitance of 0.047 µF.

TABLE 1

| Sample No. | Dummy Electrode | Narrow Extended Portion | Curvature of Extended Portion | Thickness of Internal Electrode | |
|---|---|---|---|---|---|
| | | | | 0.65 µm | 0.85 µm |
| 1 | Above and below | Present | Large | 150 mΩ | 135 mΩ |
| 2 | Above and below | Absent | Small | 100 mΩ | 75 mΩ |
| 3 | None | Present | Middle | 125 mΩ | 100 mΩ |
| 4 | None | Absent | Minor | 90 mΩ | 65 mΩ |
| 5 | Only above | Present | Middle | 130 mΩ | 110 mΩ |
| 6 | Only below | Present | Middle | 135 mΩ | 125 mΩ |
| 7 | None | Absent | None | 85 mΩ | 61 mΩ |

In order to produce the main body of the multi-terminal capacitor in Sample 1, the internal electrodes and the dummy electrodes were formed on ceramic green sheets by screen printing with a conductive paste containing nickel. Six ceramic green sheets having the internal electrodes arranged thereon were layered, five ceramic green sheets having the dummy electrodes arranged thereon were layered both above and below the ceramic green sheets having the internal electrodes arranged thereon, and a plurality of ceramic green sheets having no internal electrodes and no dummy electrodes thereon was layered both above and below the ceramic green sheets having the dummy electrodes thereon. The ceramic green sheets were pressed in the layering direction and fired to produce the main body of the multi-terminal capacitor having dimensions of about 2.0 mm×1.25 mm×0.55 mm.

In order to produce the main body of the multi-terminal capacitor according to Sample 1, the terminal connecting portions of the internal electrodes had a width of about 150 µm, and the extended portions had a width of about 80 µm and a length of about 100 µm. As shown in the column "Thickness of Internal Electrode" in Table 1, two kinds of internal electrodes having an application thickness of about 0.65 µm and an application thickness of about 0.85 µm were manufactured.

As shown in Table 1, the main body of the multi-terminal capacitor according to Sample 2 differs from that according to Sample 1 in that the internal electrodes did not have the narrow extended portions. The main body of the multi-terminal capacitor according to Sample 3 differs from that according to Sample 1 in that the main body did not have the dummy electrodes. The main body of the multi-terminal capacitor according to Sample 4 differs from that according to Sample 1 in that the main body did not have the dummy electrodes and the internal electrodes did not have the narrow extended portions. The main body of the multi-terminal capacitor according to Sample 5 differs from that according to Sample 1 in that the main body had the dummy electrodes only above the layered internal electrode. The main body of the multi-terminal capacitor according to Sample 6 differs from that according to Sample 1 in that the main body had the dummy electrodes only below the layered internal electrode. The main body of the multi-terminal capacitor according to Sample 7 differs from that according to Sample 1 in that the main body did not have the dummy electrodes and the internal electrodes did not have the narrow extended portions. In addition, the extended portions according to Samples 1 to 6 were curved, whereas the extended portions according to Sample 7 were not curved.

In the baking for producing the main body of the multi-terminal capacitor, the oxygen concentration was adjusted to set the coverage of the internal electrodes to a value of about 65% or more without evaporation of the internal electrodes.

A barrel pot was filled with the main body of the multi-terminal capacitor according to each sample, a barrel medium, and purified water. Then grinding was performed by the use of a centrifugal barrel finishing machine such that the terminal connecting portions of the internal electrodes were surely exposed on the side surfaces of the main body of the multi-terminal capacitor.

Then, in order to form the external terminal electrodes electrically connected to the terminal connecting portions of the internal electrodes, a conductive paste containing copper was applied to predetermined positions on the side surfaces of the main body of the multi-terminal capacitor and the applied conductive paste was baked by the use of a continuous furnace. Furthermore, nickel plating having a thickness of about 2 μm was applied on the surfaces of the external terminal electrodes, and tin plating having a thickness of about 4 μm was applied on the nickel plating.

The ESRs of the multi-terminal capacitors according to the samples manufactured in the manner described above were measured. The results are shown in the columns below the column for "Thickness of Internal Electrode" in Table 1. In addition, the electrostatic capacitances of the multi-terminal capacitors according to the samples were measured. The multi-terminal capacitors having measured values of the electrostatic capacitance, which were 90% or less of a planned value of 0.047 μF, were classified as bad ones and the incidence of the bad ones was calculated. The results are shown in columns below a column for "Thickness of Internal Electrode" in Table 2.

TABLE 2

| Sample No. | Thickness of Internal Electrode | |
|---|---|---|
| | 0.65 μm | 0.85 μm |
| 1 | 0% | 0% |
| 2 | 0% | 0% |
| 3 | 3.1% | 0.6% |
| 4 | 3.5% | 0.5% |
| 5 | 0% | 0% |
| 6 | 0% | 0% |

As apparent from Table 1, on the assumption that a desired ESR value is about 150 mΩ, this desired value can be achieve if the thickness of the internal electrodes according to Sample 1 is about 0.65 μm. In addition, an ESR value exceeding about 100 mΩ can also be achieved if the thickness of the internal electrodes according to Sample 1 is about 0.85 μm, and also in Samples 5 and 6.

In comparison of Sample 4 to Sample 7, Sample 4, which was manufactured such that the extended portions are curved by increasing the pressure in the pressing of the ceramic green sheets, had ESR values slightly higher than those of Sample 7.

In comparison between Samples 1 to 7, higher ESR values were achieved in the ascending order of Samples 7, 4, 2, 3, 5, 6, and 1. This means that higher curvatures of the extended portions of the internal electrodes were achieved in the ascending order of Samples 7, 4, 2, 3, 5, 6, and 1 and, therefore, longer effective lengths of the extended portions were achieved in the same ascending order.

In comparison between Samples 1, 5, and 6, higher ESR values were achieved in the ascending order of 5, 6, and 1. This comparison shows that higher ESR values can be achieved in the case where the dummy electrodes are arranged only below the layered internal electrodes, compared with the case where the dummy electrodes are arranged only above the layered internal electrodes, and that the highest ESR values can be achieved in the case where the dummy electrodes are arranged both above and below the layered internal electrodes.

Referring to Table 2, in comparison of Samples 1, 2, 5, and 6 having the dummy electrodes to Samples 3 and 4 having no dummy electrodes, the formation of the dummy electrodes improve the reliability of the electrical connection between the internal electrodes and the external electrodes to inhibit failures, including a lack of the electrostatic capacitance from occurring.

Figure 6A:
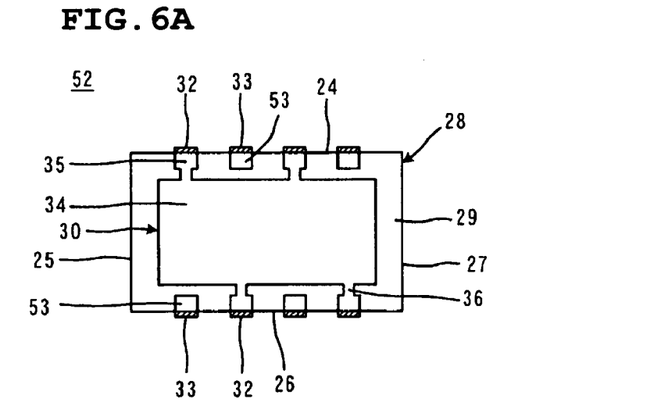
FIGS. 6A and 6B include diagrams corresponding to FIGS. 2B and 2C, according to a second preferred embodiment of the present invention.
Figure 6B:
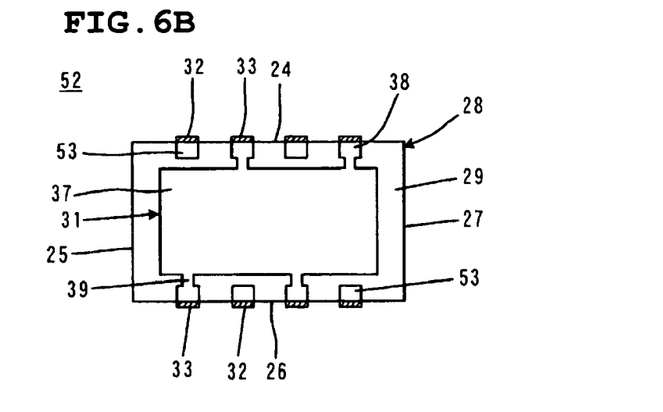
Figure 7:
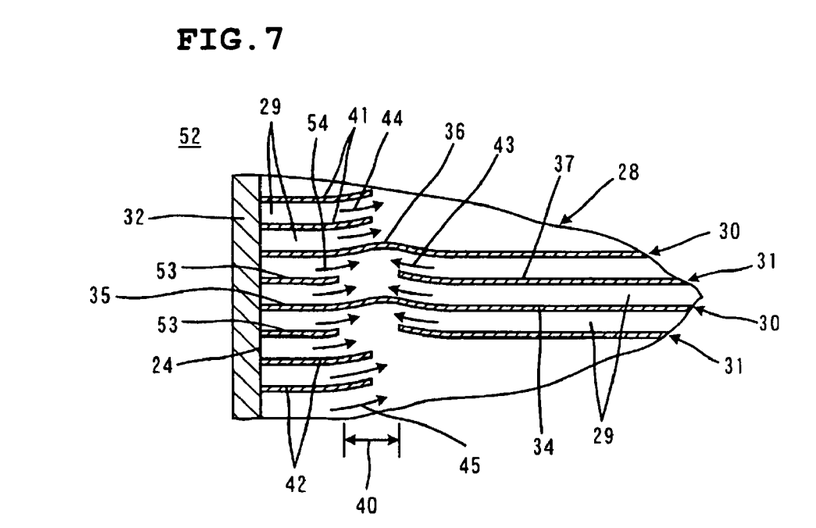
FIG. 7 is a diagram corresponding to FIG. 4, for illustrating the second preferred embodiment in FIGS. 6A and 6B.
Figure 8:
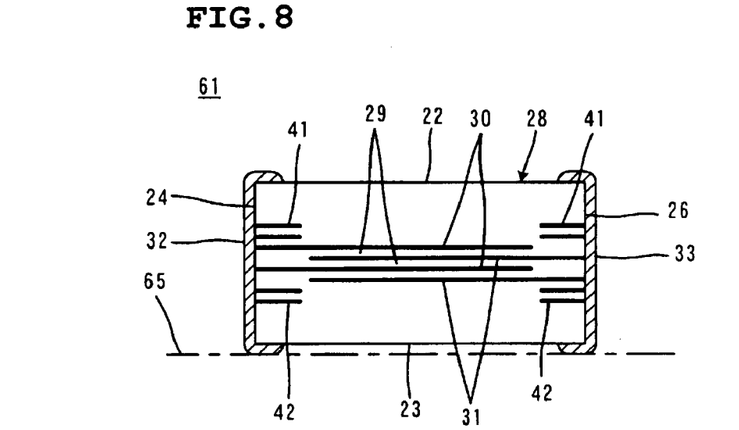
FIG. 8 is a cross-sectional front view showing a multilayer capacitor for illustrating a first preferred embodiment relating to the arrangement of internal electrodes.

FIGS. 6A, 6B, and 7 illustrate a second preferred embodiment of the present invention. FIGS. 6A and 6B correspond to FIGS. 2A to 2D and, specifically, FIG. 6A corresponds to FIG. 2B and FIG. 6B corresponds to FIG. 2C. FIG. 7 corresponds to FIG. 4. The same reference numerals are used in FIGS. 6A, 6B, and 7 to identify the same elements shown in FIGS. 2A to 2D and 4. A detailed description of those elements is therefore omitted herein.

A multi-terminal capacitor 52 according to the second preferred embodiment is characterized in that dummy electrodes 53 are arranged on the ceramic green sheets having the internal electrodes 30 and 31 provided thereon.

According to the second preferred embodiment, as shown in FIG. 7, the ceramic green sheets flex in directions shown by arrows 54 due to the thicknesses of the dummy electrodes 53. The flexing of the ceramic green sheets in the directions shown by the arrows 54 increases the curvature of the extended portions 36 and 39 of the internal electrodes 30 and 31, respectively.

FIGS. 8 to 11 illustrate various preferred embodiments relating to the arrangement of the internal electrodes and are cross-sectional front views of multilayer capacitors. The same reference numerals are used in FIGS. 8 to 11 to identify the same elements shown in, for example, FIGS. 1 to 4. A detailed description of those elements is therefore omitted herein. The curvature of the extended portions of the internal electrodes 30 and 31 is omitted in FIGS. 8 to 11.

Since the multilayer capacitor according to the preferred embodiments of the present invention provide an increased ESR, a smaller number of the internal electrodes are normally layered. Accordingly, in a multilayer capacitor 61 shown in FIG. 8, the internal electrodes 30 and 31 are often provided in the middle portions in the layering direction of the main body 28. As a result, when the multilayer capacitor 61 is mounted on a mounting surface 65 shown by a long and short dashed line, a minimum current loop formed between the first and second external terminal electrodes 32 and 33 becomes relatively large to increase the ESL. In addition, a larger stray capacitance is generated between the multilayer capacitor 61 and the mounting surface 65 and, therefore, it is likely to cause secondary resonance in a higher frequency band.

Figure 9:
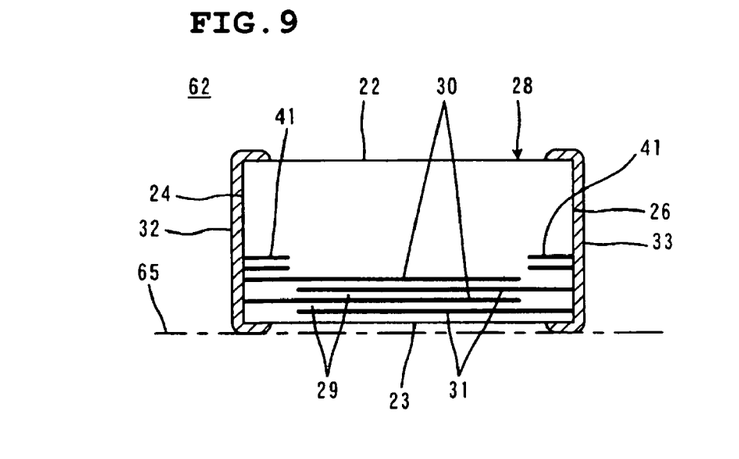
FIG. 9 is a cross-sectional front view showing a multilayer capacitor for illustrating a second preferred embodiment relating to the arrangement of the internal electrodes.
Figure 10:
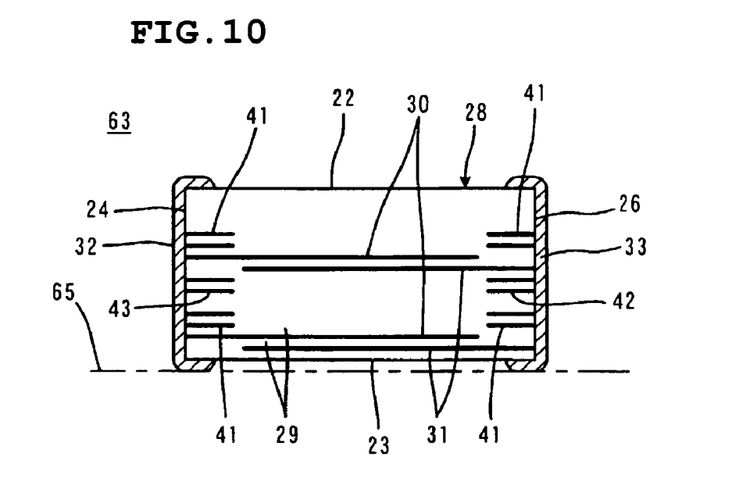
FIG. 10 is a cross-sectional front view showing a multilayer capacitor for illustrating a third preferred embodiment relating to the arrangement of the internal electrodes.
Figure 11:
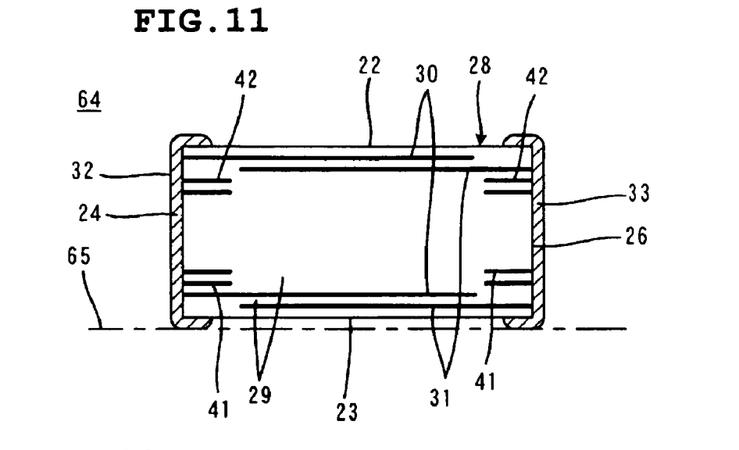
FIG. 11 is a cross-sectional front view showing a multilayer capacitor for illustrating a fourth preferred embodiment relating to the arrangement of the internal electrodes.

The above problems can be resolved by using multilayer capacitors 62 to 64 shown in FIGS. 9 to 11, respectively.

In the multilayer capacitor 62 in FIG. 9, all the internal electrodes 30 and 31 are provided near the main surface 23 of the main body 28, opposing the mounting surface 65.

In the multilayer capacitor 63 in FIG. 10, one pair of the first and second internal electrodes 30 and 31 is provided near the main surface 23 of the main body 28, opposing the mounting surface 65.

In the multilayer capacitor 64 in FIG. 11, one pair of the first and second internal electrodes 30 and 31 is provided near the main surface 23 of the main body 28, opposing the mounting surface 65, and another pair of the first and second internal electrodes 30 and 31 is provided near the main surface 22 of the main body 28. There is no need to consider the orientation of the multilayer capacitor 64 in the mounting thereof in FIG. 11.

According to the multilayer capacitors 62 to 64 shown in FIGS. 9 to 11, the minimum current loop can be reduced in size. With regard to at least one pair of the internal electrodes for reducing the size of the minimum current loop, the surfaces having the internal electrodes provided thereon are not necessarily required to be opposed to each other. The edges of the internal electrodes may be opposed to each other.

Although the preferred embodiments are mainly described above with respect to multi-terminal capacitors, the present invention is not limited to the multi-terminal capacitor. The present invention is also applicable to a multilayer capacitor having a general structure.

Although the extended portions 36 and 39 of the internal electrodes 30 and 31 are narrower than the capacitance generating portions 34 and 37 and the terminal connecting portions 35 and 38 in the above-described preferred embodiments shown in the figures, the widths of the extended portions may be equal to the width of the capacitance generating portion, may be equal to the width of the terminal connecting portions, or may be equal to the widths of the capacitance generating portion and the terminal connecting portions. Furthermore, the extended portions may be wider than the capacitance generating portion, may be wider than the terminal connecting portions, or may be wider than the capacitance generating portion and the terminal connecting portions.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A multilayer capacitor comprising:
a main body having first and second main surfaces and four side surfaces connecting the first and second main surfaces to each other, a plurality of dielectric layers, at least one pair of first and second internal electrodes between the dielectric layers and opposed to each other so as to generate an electrostatic capacitance; and
first and second external terminal electrodes arranged on an external surface of the main body so as to be electrically connected to the first and second internal electrodes, respectively; wherein each of the first and second internal electrodes has a capacitance generating portion arranged to generate the electrostatic capacitance, a terminal connecting portion connected to the external terminal electrode, and an extended portion connecting the capacitance generating portion to the terminal connecting portion; and
the extended portion of at least one of the internal electrodes is narrower than the capacitance generating portion and the terminal connecting portion;
the multilayer capacitor further comprises at least one dummy electrode arranged so as to be layered on the terminal connecting portion of the at least one of the internal electrodes; and
an end of the at least one dummy electrode extends toward a position opposed to a lengthwise intermediate portion of the extended portion of the at least one of the terminal electrodes so as to cause the extended portion of the at least one of the internal electrodes to be curved in a direction of its thickness at a position opposed to the end of the at least one dummy electrode.

2. The multilayer capacitor according to claim 1, wherein the at least one dummy electrode includes at least one dummy electrode arranged below the first and second internal electrodes.

3. The multilayer capacitor according to claim 2, wherein the at least one dummy electrode further includes at least one dummy electrode arranged above the first and second internal electrodes.

4. The multilayer capacitor according to claim 1, wherein the extended portion that is curved in the direction of its thickness is thinner than the capacitance generating portion and the terminal connecting portion.

5. The multilayer capacitor according to claim 1, wherein at least one pair of the internal electrodes is adjacent the first main surface of the main body, the first main surface opposing a mounting surface for the multilayer capacitor.

6. The multilayer capacitor according to claim 5, wherein all of the first and second external terminal electrodes are adjacent the first main surface.

7. The multilayer capacitor according to claim 5, further comprising another pair of the first and second internal electrodes adjacent the second main surface of the main body.

8. The multilayer capacitor according to claim 1, wherein the first and second external terminal electrodes are alternately arranged along one of the side surfaces of the main body.

9. A method of manufacturing a multilayer capacitor including a main body having first and second main surfaces and four side surfaces connecting the main surfaces to each other, a plurality of dielectric layers, at least one pair of first and second internal electrodes between the dielectric layers and opposed to each other so as to generate an electrostatic capacitance; first and second external terminal electrodes arranged on an external surface of the main body so as to be electrically connected to the first and second internal electrodes, respectively; wherein each of the first and second internal electrodes has a capacitance generating portion functioning so as to generate the electrostatic capacitance, a terminal connecting portion connected to the external terminal electrode, and an extended portion connecting the capacitance generating portion to the terminal connecting portion; and the extended portion of at least one of the internal electrodes is curved in the direction of its thickness, the method comprising steps of:
preparing a plurality of ceramic green sheets, which serve as the dielectric layers;

forming an internal electrode on at least one of the ceramic green sheets;

forming a dummy electrode on at least one ceramic green sheet so as to overlap with the terminal connecting portion of the internal electrode;

layering and pressing the plurality of ceramic green sheets in order to produce the main body in an unfired state, including a step of pressing a portion of the ceramic green sheets provided between the capacitance generating portions of the internal electrodes and between the terminal connecting portion and the dummy electrode so as to flex toward the extended portion of the internal electrode to curve the extended portion in the direction of its thickness; and firing the main body.

10. The method of manufacturing the multilayer capacitor according to claim 9, wherein the step of forming the dummy electrode includes a step of forming the dummy electrode on a ceramic green sheet having no internal electrode formed thereon; and the step of layering and pressing the ceramic green sheets further includes:

a step of layering and preliminarily pressing the ceramic green sheet having the dummy electrode formed thereon but having no internal electrode formed thereon to curve the inner edges of the dummy electrode in a layering direction; and a step of layering and preliminarily pressing the ceramic green sheet having the internal electrode formed thereon to curve the extended portion in the direction of its thickness along the curvature of an inner edge of the dummy electrode.

11. The method of manufacturing the multilayer capacitor, according to claim 10, wherein the step of forming the dummy electrode further includes a step of forming the dummy electrode on a ceramic green sheet having the internal electrode formed thereon.

* * * * *